Feb. 13, 1962    R. G. HORROCKS ETAL    3,021,382
APPARATUS FOR SUPPORTING AND SPACING AERIAL CABLES
Filed March 7, 1960    2 Sheets-Sheet 1
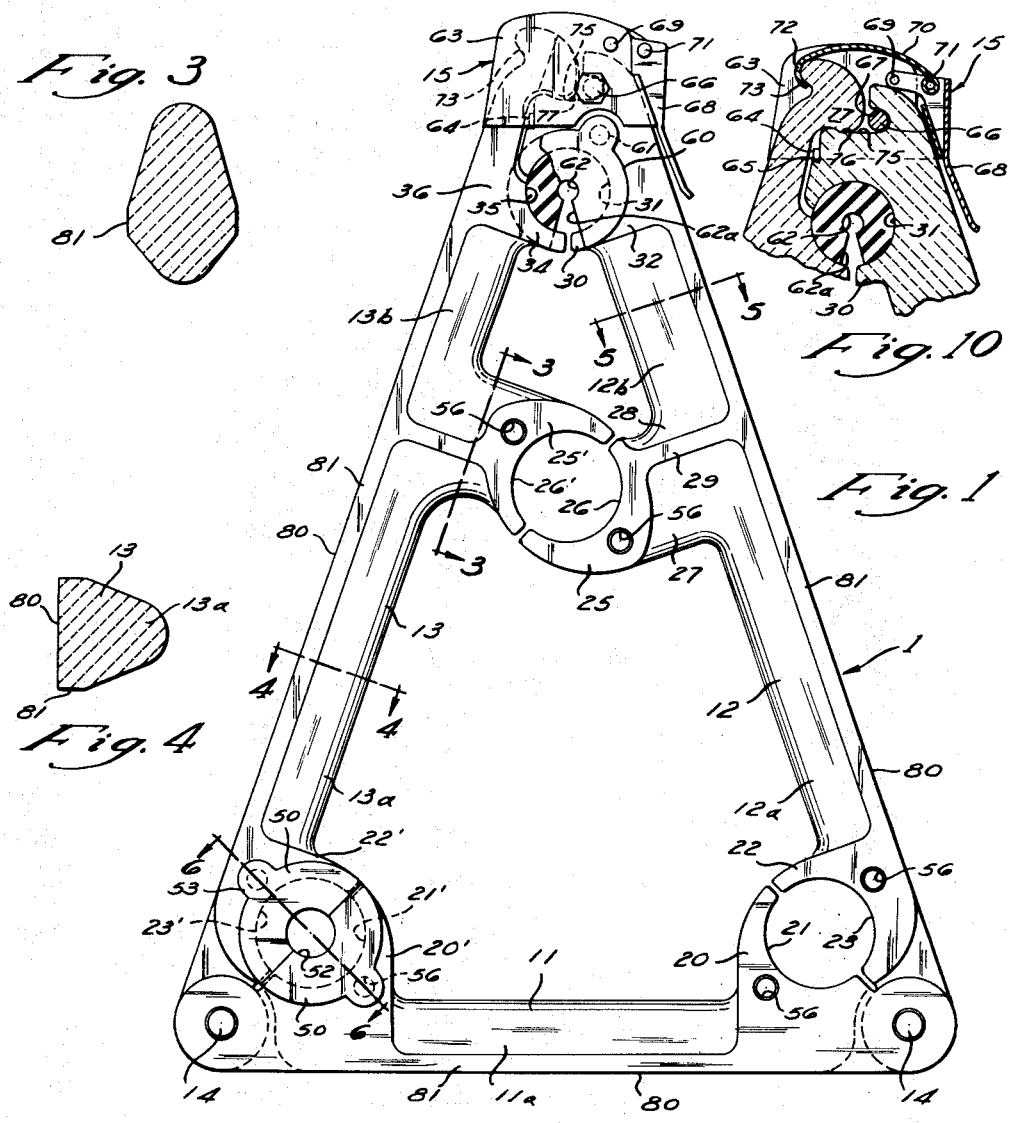
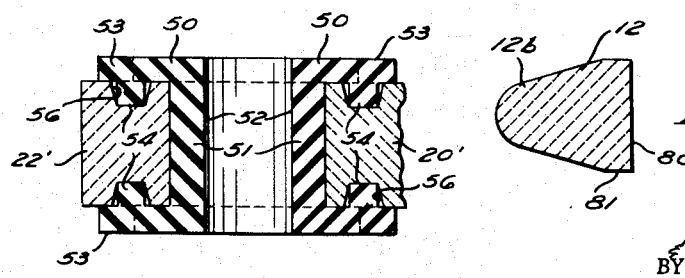
INVENTORS
RAYMOND G. HORROCKS,
CARROLL DE V. MILLER,
THEODORE J. BRENNER
BY WATTS, EDGERTON, PYLE & FISHER
ATTORNEYS

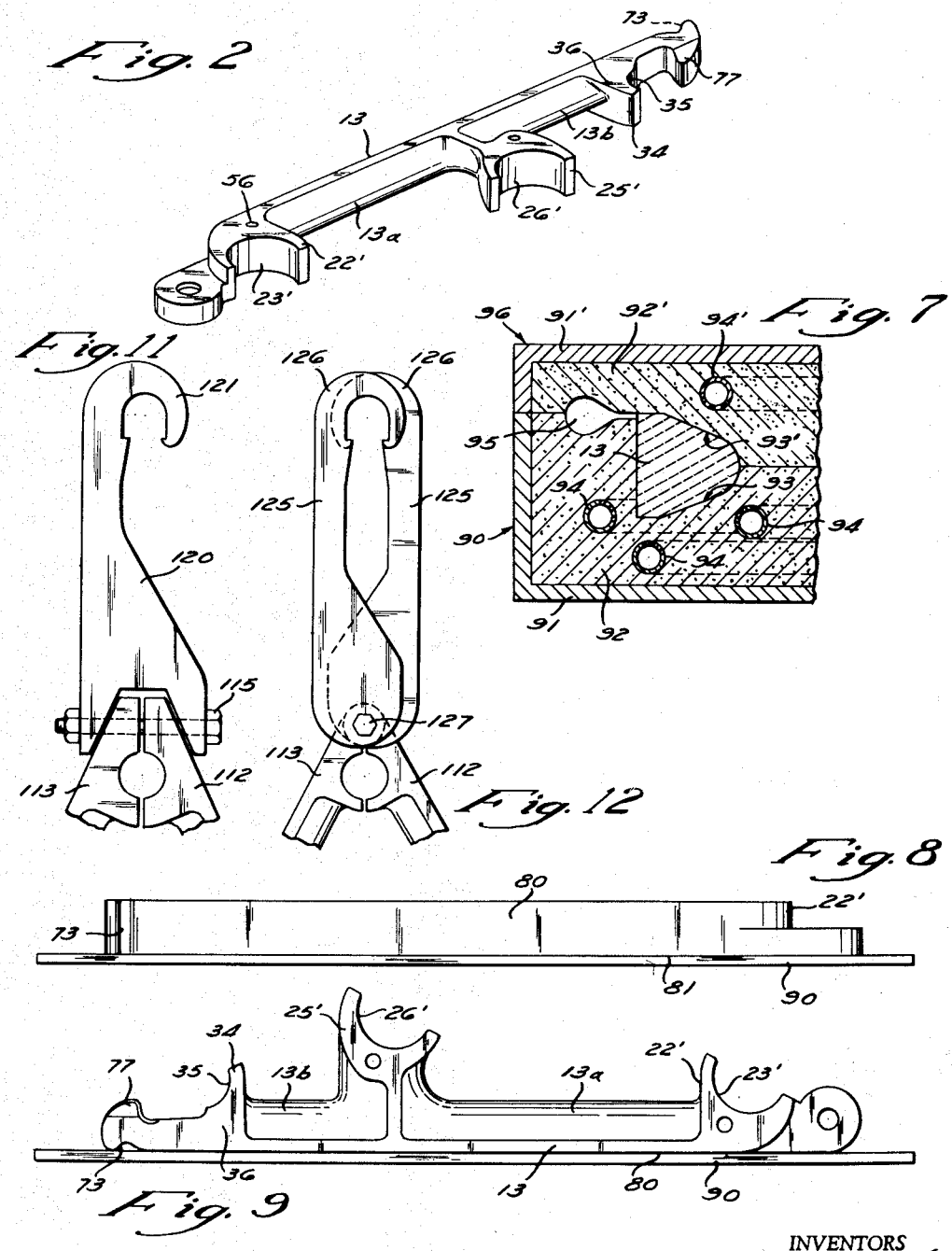

United States Patent Office 3,021,382
Patented Feb. 13, 1962

3,021,382
APPARATUS FOR SUPPORTING AND SPACING
AERIAL CABLES
Raymond G. Horrocks, Lakewood, and Carroll de V.
Miller and Theodore J. Brenner, Rocky River, Ohio,
assignors to PLM Products, Inc., Cleveland, Ohio, a
corporation of Ohio
Filed Mar. 7, 1960, Ser. No. 13,091
6 Claims. (Cl. 174—174)

This invention relates to the electrical power distribution art in general, and relates more particularly to a new and novel electric cable supporter and spacer composed essentially of alumina, and to a method of making such large, irregularly-shaped ceramic article consisting essentially of alumina.

For many years, numerous workers in the art, including engineers and inventors, have sought to solve the problem of providing a fully satisfactory supporter and spacer device for electrical aerial cables.

Certain of the synthetic resins were used in making a variety of types of such devices primarily because they could be readily made, as by injection molding. In extended use of such plastic devices, hidden or unknown weaknesses were exposed, such as the inability of the material to withstand extremely high or low temperatures, and the effects of discharges resulting from power supplied by capacitative charging currents from one cable to another through dirt and moisture on the resin. For these reasons the problem of providing a satisfactory device for supporting and spacing semi-insulated aerial cables for three-phase electrical current of voltages of 5 kv. (kilovolts) and upward to 35 kv. or above was not solved by the use of synthetic resins.

Before and during the time workers were trying to solve that problem with the resins, it was well known that numerous ceramic materials possessed mechanical and electrical properties which suited them for use as materials of construction for electrical insulators and which would have suited them as materials from which to make devices for supporting and spacing aerial cables. One of those ceramics, porcelain, had been used extensively in a wide variety of parts in the electrical industry. It was known at the same time that alumina had properties and characteristics greatly superior to porcelain and the other ceramic materials for electrical uses.

Despite the superiority of the ceramics and particularly alumina, no one prior to this invention, so far as we know, produced a device for supporting and spacing cables composed of any of the suitable ceramics especially alumina. While the thought to substitute alumina for the synthetic resins used in making those devices may have been obvious, how to make such a device of alumina was not obvious to anyone skilled in that art. Neither the molds for the resin nor the resin extrusion process could be used with alumina. The shapes of the resin devices could not be duplicated in alumina. The resin device was shape maintaining when romoved from the mold while a molded alumina mixture has little strength when taken from a mold (green strength) and acquired its strength only slowly and required intermediate handling. In short, it was not obvious to one skilled in either the resin or ceramic arts how to solve the above stated problem.

We have found that there was no simple or obvious solution of the problem because of the presence of numerous conflicting factors which, unless reconciled, would prevent the production of a satisfactory device consisting essentially of fused alumina for supporting and spacing aerial cables.

The present invention reconciles several conflicting factors which are presented when the use of alumina is contemplated as a material of construction for an aerial cable support and spacer device.

The recognition and present reconciliation of the conflicting factors now makes possible the construction of various structural forms not heretofore possible. Of necessity, only a teaching illustration is possible herein. Since each specific piece will require application of the variables to that specific case, this description sets forth the values of the variables which are proper under the circumstances of a cable support and spacer and will point out the direction in which the values must be varied for other applications. Some experimentation will be unavoidable in selecting the values suitable for other applications, but this specific set of values will provide sufficient direction so that persons skilled in the art can reproduce the invention without resorting to independent invention.

Two of the conflicting factors are the high specific gravity of fused alumina and the necessity of keeping the weight of such device to a minimum because it is suspended from a messenger cable strung between poles where weight is an important item. Since the specific gravity cannot be altered, the weight of the device can be reduced only by reducing its structural mass and cross-sectional areas. Another factor is that the device must be strong enough to withstand the severe service conditions to which it may be subjected; for example, high winds, snow, and ice accumulations—or both—as well as other conditions that impose tensile stresses of various values on the parts of the device. Since the tensile strength of alumina is high when fused without incipient cracks producing planes of weakness, the cross-sectional area of the parts of such device may be made small as compared with the area required for many other materials, including porcelain.

Another such factor is that the cohesive strength of the raw mixture of alumina varies from practically no cohesive strength with no bonding agent through increasing cohesive strength value as the amount of bonding agents increases, up to perhaps 25 percent of the total mixture. Since such a mixture is molded while moist and must dry without breakage of cohesion and the creation of voids or cracks, a mixture is chosen which has sufficiently high cohesion to afford the necessary strength during the drying operation. Since the tensile strength of the non-combustible bonding material is far less than that of the alumina after firing, the tensile strength of the article will vary inversely with the amount of such bonding material in the mixture. Thus, a compromise must be made between a mixture which will give high cohesive strength during the drying period, that is, while the article is "green" and the tensile strength desired in the finished article, and these two factors must be correlated with the weight and cross-sectional areas above mentioned.

Since the parts of an aerial cable support and spacer device are quite irregular in shape with bosses of considerable length extending transversely of other smaller parts of the device to surround and clamp the cables and since the parts should be as light as possible for reasons stated above, the smaller portions of each part which connect the larger parts should be as small as possible and yet have the necessary cohesive and tensile strength to insure that the shrinkage will take place without the development of shrink cracks either on the surface or internally. The resistance to such shrinkage is the friction created by the shrinking movement of the green article on the non-shrinking sagger during the fusing of the material. Thus, it is important to provide enough strength in the article to overcome the friction and result in the expected shrinkage without the development of shrink cracks.

Another such factor is the high shrinkage of the article in going from the dried green stage to the fused state. It is common practice in the present art of producing articles of fused alumina to provide a support sagger of the same material, or material having a similar shrinkage characteristic under firing conditions. Thus, the support contracts with the article and does not produce a frictional drag tending to crack the article as it is fired. Unfortunately, in the production of large and complex articles, such as support sagger becomes expensive and difficult to make, and then is useful for only one piece. According to this invention, the parts are provided with planar support surfaces which rest on a prefired sagger and on which the part may shrink with the minimum amount of frictional resistance and such sagger may be used repeatedly and hence is a low expense item.

Another factor is that the larger parts, and particularly the bosses, should be so positioned and shaped that they will not sag or otherwise change shape or position during the "green" period or firing period when the material becomes semiplastic with resultant creation of breakage of cohesion in the article adjacent to, or in these larger parts.

A further important factor is to correlate the rate of removal of moisture from the various different sized portions of the article so that the formation of internal shrink cracks, voids and the like, during subsequent heating and firing may be avoided.

Since the mixture hardens and becomes denser as it loses moisture during the drying period, it is important to retard the rate of drying and the consequent hardening and densifying of the surface portions of the article to permit the moisture in the central portions to dissipate into, and largely through, the surface portions before they become substantially impervious to the passage of moisture or vapor through them. Otherwise, moisture will be trapped within the article and at the high temperatures to which the article is heated for fusing, the moisture will be vaporized and may tend to create small voids, hair line fissures, cracks and the like which reduce the tensile strength. Moreover, moisture is eliminated more slowly from large sections than small sections and hence the rate of drying of the different sections of an article should be so controlled that the moisture will be removed throughout all portions at approximately the same time, or in such intervals as will not result in internal faults due to moisture retained in any portion. Such control of drying rates is achieved largely by controlling the removal of moisture from the various portions of the article by different parts of the mold and partly by controlling air removal of the moisture, as will be explained presently.

The present invention, as stated above, reconciles all these several conflicting factors and produces an article radically different from articles constructed heretofore to our knowledge. Moreover, so far as we know, no one heretofore has ever reconciled the above listed factors, as we have done, with the resultant production of fused alumina articles of such irregular shape and with such large and small sections and at costs competitive with similar devices composed of materials of comparatively inferior properties. While the invention is applicable to such devices of a wide variety of types and kinds, it will be described hereinafter in connection with the type of device disclosed and explained in U.S. Patent No. 2,912,-482, issued November 10, 1959. That device, as well as those illustrated herein is for supporting and spacing semi-insulated cables carrying three-phase alternating current having voltages of from 5 kv. to 35 kv. or higher. However, it is to be understood that the invention is not to be restricted to those particular devices.

The present invention will be better understood by those skilled in the art from the following disclosure taken in connection with the drawings accompanying and forming a part of this specification in which:

FIGURE 1 is a side elevational view, partly in section of an aerial cable support and spaced device embodying the present invention;

FIGURE 2 is a perspective view of one of the side members of the device of FIGURE 1;

FIGURES 3, 4 and 5 are cross-sectional views taken along lines 3—3, 4—4 and 5—5 of FIGURE 1, respectively;

FIGURE 6 is a fragmentary cross-sectional view taken along line 6—6 of FIGURE 1;

FIGURE 7 is a fragmentary cross-sectional view of a mold showing part of one of the members of the device of FIGURE 1 in position therein;

FIGURE 8 is a side elevational view of one of the parts of the device of FIGURE 1 in green form after being removed from the mold and positioned on a support for initial drying;

FIGURE 9 is a side elevational view of the dried article positioned on a sagger for firing;

FIGURE 10 is a cross-sectional view of a latch or clamp for detachably connecting the free ends of the sides of the cable spacer and support device of FIGURE 1;

FIGURE 11 is a fragmentary, side elevational view of a device for supporting and spacing aerial cable carrying three-phase 35 kv. current; and FIGURE 12 is a fragmentary view of a modified form of the apparatus of FIGURE 11.

The aerial support and spacer device 1 shown in FIGURE 1 is quite like the device illustrated in U.S. Patent No. 2,912,482, issued on November 10, 1959, but differs therefrom in certain structure and materials of construction respects, as will be pointed out presently. The device 1 of FIGURE 1 comprises an intermediate or bottom 11 and two sides 12 and 13 pivotally connected at their lower ends to the ends of bottom 11 by any suitable means, for example, by nylon or stainless bolts 14. The upper or free ends of sides 12 and 13 are detachably connected together by any suitable latch or clamp means, for example the multipart clamp 15, presently to be described.

The parts 11, 12 and 13 are long and irregular in shape and each one includes at least one elongated portion of small cross-sectional area; these small portions being indicated at 11a on part 11; 12a and 12b on part 12; and 13a and 13b on part 13. Each of the members has at least two other portions which are of large cross-sectional area and which project various distances from the small portions just described. These large portions include portions which might be called bosses, which extend transversely to the longitudinal axis of the respective parts 11, 12 and 13, and which have arcuately shaped inner surfaces to extend partly around a cable. More particularly, part 11 has bosses 20 and 20' near its ends and these bosses have arcuate surfaces 21 and 21' as just described. Similarly, part 12 has a boss 22 at its lower end with an arcuate inner surface 23. The bosses 20 and 22 are positioned substantially as shown in FIGURE 1 when the device is assembled and with the surfaces 21 and 23 defining substantially a circle within which an aerial cable is to be confined. Part 13 has a boss 22' with an inner surface 23' which are quite like boss 22 and its inner surface 23 of part 12.

Between its ends, part 12 is provided with a boss 25 which has a substantially semi-circular inner surface 26 and this boss 25 is connected to part 12 by webs 27 and 28 extending longitudinally of part 12 and by transverse webs 29 on either side of those webs. Thus, boss 25 is supported by the webs 27, 28 and 29.

Part 13 has a boss 25' and an inner surface 26' which are respectively quite like boss 25 and surface 26 of part 12. When the parts 12 and 13 are assembled as shown in FIGURE 1, these two surfaces 26 and 26' constitute a substantially complete circle to surround an aerial cable.

At its upper end, part 12 is provided with a boss 30 and has an arcuate surface 31 which is preferably more than 180 degrees in circumferential length and which, when the part is assembled with a supporting cable or messenger, will extend over the top of the messenger and support the device of FIGURE 1 on the messenger, hook fashion. Part 12 is substantially as thick in a transverse direction as the length of boss 30, as is indicated at 32.

Part 13 is provided with a boss 34 which is quite like boss 30 but somewhat shorter in circumferential length and is provided with an arcuate inner surface 35. When the parts 12 and 13 are assembled as shown in FIGURE 1, surfaces 31 and 35 define substantially a complete circle within which a messenger may be confined. Part 13 is thickened at its upper end as indicated at 36, substantially the same as it is shown at 32 of part 12.

Since it is desirable to provide resilient means in the bosses which may be clamped about the several cables so as to hold the device of FIGURE 1 against movement relative to any of the cables and also to compensate for manufacturing variations in dimensions of the parts, resilient liners, commonly called grommets, are provided for each of the several arcuate surfaces of the bosses. Preferably, these grommets are made in substantially semi-circular form so that they may cooperate in pairs, each pair to surround a cable. In FIGURE 6 parts of two of these grommets are shown. Bosses 20' and 22' are shown assembled with two grommets 50, each grommet having a semi-cylindrical portion 51 provided with a substantially semi-cylindrical inner surface 52 and substantially parallel flanges 53 to lie against the edges of the bosses. Each flange 53 has a finger 54 to be placed in a round hole 56 in the boss to retain the grommet in place. Each grommet 50 may be assembled with its boss simply by moving flanges 53 apart and moving them over the boss and springing the fingers 54 into the finger receiving holes 56.

The grommets, assembled as shown at the lower left hand corner of the FIGURE 1, will be similarly assembled with bosses 20 and 22 and bosses 25 and 25'. A one-piece grommet 60 is preferably used with bosses 30 and 34 and this grommet has fingers 61 similar to fingers 54 of grommet 50 and these fingers are received in finger holes similar to holes 56. Grommet 60 is attached to part 12 as indicated and is provided with an axially extending opening 62 approximately the size of the messenger which is to be placed therein and with a radial opening 62a through which the messenger may be brought into the opening 62.

The latch or clamp 15 comprises a yoke 63 which straddles the upper end of side 12 and engages the outer side surface thereof, has inwardly projecting lugs 64 engageable with ledge 65 on the inner side surface of side 12, and is held in place by bolt 66 which extends through a notch 67 in side 12. A lever 68 is pivoted on a bolt or pin 69 carried by yoke 63 and, in turn, pivotally carries a pawl 70 on a bolt or pin 71. The free end 72 of pawl 70 is hook-shaped to engage in a notch 73 on the outer surface of side 13. The opposed parts of sides 12 and 13 are shaped to cooperate with the latch 15 in constituting a firm connection. Side 12 has top surface 75 with a transverse depression 76. Side 12 has a hook-like projection 77 shaped and positioned to seat in depression 76 when the latch is in clamped position.

The device of FIGURE 1 may be assembled with a messenger and a plurality of aerial cables substantially in the following manner: The pawl 70 is unlatched and sides 13 and 11 are moved downwardly into substantially vertical alignment with part 12; then the grommet 60 is placed above the messenger and the latter is brought into axial opening 62, whereupon the device will be retained in assembled position with the cable without any manual support. Then, the upper aerial cable is placed on the grommet on boss 25 where it will remain due to the fact that the boss 25 extends beyond a vertical plane through the center of the cable; then the lower right-hand cable is placed on the grommet of boss 20 and part 11 is moved about pivot 14 to bring that cable into contact with the grommet of boss 22. At that time the part 11 is in an approximately horizontal position, as shown in FIGURE 1. The lower left-hand cable may then be placed on the grommet of boss 20' and part 13 may then be moved about its pivot 14 and the grommet on boss 22' will be brought against that cable. As part 13 is so moved, boss 25' engages the outer surface of the cable previously assembled with the grommet of boss 25. With the parts so assembled, parts 12 and 13 are moved together to cause the projection 77 to move over into depression 76 whereupon the pawl 70 may be actuated to clamp side 13 against side 12.

It will be noted by reference to FIGURES 1 through 5 that the cross-sectional areas of the correspondingly indicated portions of the several parts differ considerably.

The cross-sectional area of the support of boss 25' is shown in FIGURE 3. The parts 11a, 12a and 13a are of substantially the size shown in FIGURE 4. The cross-sectional area of part 12b is larger than that of 12a as is shown in FIGURE 5. The part 12b of side 12 is enlarged since it is the part which is grasped by the operator in assembling the device with the messenger and also in latching the free ends of the members 12 and 13 together as above mentioned.

FIGURES 4 and 5 illustrate that the several parts 11, 12 and 13 have an outer surface 80 which is flat, smooth, and planar, and that smooth planar side surfaces 81 extend at right angles to the surface 80. By reference to FIGURES 2 and 3, it will be seen that the end surfaces of bosses 22' and 25' and 34 lie in the planes of side surfaces 81. As a result of this location of these surfaces, the enlarged portions of the several parts 11, 12 and 13 of the device are supported while in the "green" stage by being laid on their sides, as is shown in FIGURE 8. During firing, each of the three parts of the device of FIGURE 1 may be placed with its outer surface 80 on sagger plate 90.

FIGURE 7 illustrates fragmentarily a type of mold in which articles embodying the present invention may be made. This mold comprises a drag 90 which includes a metal casing 91 containing a hard, wear resistant, porous, water absorptive plaster mold 92 having part of cavity 93 for the desired article in its upper surface and containing tubing 94 apertured and embedded in the mold material and positioned to direct fluid pressure through the mold and against the article to dislodge the article from its cavity. An overflow gutter 95 surrounds cavity 93. The cope 96 includes a similar casing 91', mold 92' having part of the mold cavity 93' in its lower surface and similar tubing 94'.

In making the device of FIGURE 1, the several variable factors above mentioned may be reconciled as follows: Having determined the composition of the mix and knowing roughly the cohesive strength thereof in the "green" stage, the cross-sectional area of portions 11a, 12a, 12b, 13a and 13b are made large enough so that their strengths will be greater than the frictional resistance offered by the sagger plate to the shrinkage of the part during drying and firing; and so that these sections of the article in fired condition will be strong enough to withstand the severe service conditions to which the device will be subjected in use. At the same time, the cross-sectional area of these sections is kept as small as possible, consistent with the strengths required in the article so that the weight will be kept to a minimum. It is important to provide enough support for the heavy projecting portions such as the bosses to insure against damage such as sagging or surface cracks, during handling in the "green" stage. The molding and drying procedures selected should be such as will insure prevention or creation of serious internal strength impairing faults, such as internal shrinks, cracks, voids and the like.

More specifically, a set of conditions which has been found to be satisfactory for the parts of FIGURE 1, and which may be used as a criterion in making articles which consist essentially of fused alumina and which are large and irregular in shape is as follows: A mixture consisting of approximately 85% of alumina, 5% of clay and about 10% of one or more suitable bonding materials, such for example as paraffine, polystyrene and the like, together with water or other liquid by means of which these ingredients may be brought to a moldable consistency. Air should be removed from the moldable material as by passing it through a pug mill and it may also be subjected to a vacuum to remove air before being expelled by the pug mill. If desired, more liquid may be used to form the mixture into a "slip" but a moldable consistency is preferred because of the molding procedure which is preferred and which will be described presently. It will be understood that the alumina content may vary from about 75% to about 90% or possibly a little more and that other suitable bonding agents may be used. The important consideration is to obtain a mix which is readily moldable and has considerable cohesive strength in the "green" stage. The foregoing specific mixture had a shrinkage value of approximately 12.5 percent in going from the "green" stage through the fired stage. The ratio of sections is indicated by the following dimensions which are those of the fired article and hence about 12.5% less than the dimensions of the article when molded since the shrinkage of the specified mixture approximated the percentages. In the fired condition, side 13 was 14¾ inches in length, its width as represented by surface 80 was one inch, the side surfaces 81 were ¼ inch wide, measured transversely of the part, the transverse thickness of portion 13a was 1 inch, and the length of the section of FIGURE 3 was 1.6 inch. The length of each of the bosses 22', 25' and 34 was 1 inch, that is, as long as the width of the outer surface 80. Boss 25' extended to 3¹⁄₁₆ inches from the outer surface 80. Side 12 was about 13½ inches in length and bottom part 10 was about 9¾ inches long. The portions of parts 11 and 12 which are similar to the parts of side 13 as just described were substantially like corresponding side parts thereof. All fillets had radii of approximately ¼ inch.

When the parts 11, 12 and 13 were assembled, as shown in FIGURE 7, the centers of the aerial cable bosses were approximately at the apices of an equilateral triangle, each side of which was about 6½" long. In other words, the center of each cable was spaced about 6½" from the centers of each of the other two cables. Such spacing was sufficient to handle three-phase 15 kv. current with a minimum amount of reactance and current leakage with adequate insulation between cables to prevent the discharge of capacitative charging currents from one cable to another through or on the surface of the spacer and to prevent short circuiting by contact of two of the cables under severe storm conditions when the cable and spacing devices are suspended from a messenger and are about 30 feet apart. When three-phase 5 kv. current is to be carried by the aerial cables, the spacing between the centers of the cables may be reduced to about 4" which means that the cable support and spacer may be correspondingly decreased in size from that of FIGURE 7.

The selected mixture, well mixed in readily moldable form, is shaped into the desired article as by being molded in any suitable apparatus, but preferably in a mold of the type shown in FIGURE 7 and described hereinabove. The part of the mold cavity 93 in the drag is supplied with more than enough of the mixture to fill it and then the cope is lowered onto the mixture with resultant forcing of the mixture into and filling all parts of the cavities 93 and 93', compressing the mixtures therein and extruding the excess material into the gutter 95. After this molding operation has been completed, pressure is admitted into tubing 94 in the drag and the cope is lifted carrying with it the article which was dislodged from the drag by that pressure. When the cope has been moved up far enough for a suitable plate 90 (see FIGURE 8) to be inserted into the space between mold 92 and the bottom of the article still adhering to the cope, air under pressure is discharged through tubing 94' and the article is dislodged from the mold 92' and is deposited on plate 90. After the article has remained on its side on plate 90 for a suitable length of time, it is turned through 90° so that its back surface 80 rests on plate 90.

It is important to regulate the length of time the article is in contact with the moisture absorbent mold material. If the time is too long the mold will remove so much moisture from the article that the surface portions of the smaller sections will become hard and will retard the escape of moisture from the interior thereof and the moisture remaining at the time firing begins may cause internal cracks, voids and the like which will reduce the strength of the fired article. If the time interval is too short, the air drying time will be needlessly prolonged and the rate of production will be decreased.

It is also important to regulate the length of time the "green" article lies on its side on plate 90. Since the lower surface of the article is in contact with the moisture absorbing drag mold 92 for a shorter length of time than the upper surface is in contact with the cope mold 92', the lower surface of the article will tend to contain more moisture than the upper surface.

If this lower surface remains on the moisture absorbing plate a proper length of time, the moisture contents of the upper and lower surfaces may be approximately equalized because of the varying rates of drying of the surfaces exposed to the air and to the plate. After the moisture content of the upper and lower surfaces have been approximately equalized the article may be shifted to bring its back surface 80 into contact with the plate 90 and to allow more or less equal rates of air drying of the sides of the article.

Air drying is allowed to continue for a suitable length of time, for example an hour in the case of the article under consideration, although this time may be varied widely if desired. When the article is to be fused, it is placed on a sagger which is to carry it through the heating furnace. The sagger 90 is preferably composed of a suitable material which has little or no shrinkage during the heating operation, such for example as silicon carbide.

It is important that the engaging surface of the article and the sagger should afford the minimum of frictional resistance to the movement of the surface 80 on the sagger as the article shrinks for if that resistance is sufficiently great it may exceed the cohesive strength of some portions of the article and cause surface cracks which cannot be closed during firing. Accordingly, the engaging surface of the article and sagger should be smooth and planar.

During the firing operation the volatile constituents of the molded mixture will be vaporized and the combustible constituents will be consumed As a result the fused article will consist essentially of alumina with the small amount of clay and any other incombustible material present in the original mixture.

After the article has been satisfactorily fused, it may be given a glazed surface by placing any suitable glazing material on its surfaces and heating to fuse the glaze.

FIGURE 11 shows part of a device embodying the present invention for use with currents of high voltage, for example, from 15 kv. to 35 kv. or higher. The parts 112 and 113 are quite like parts 12 and 13 of FIGURE 1 but the upper ends of parts 112 and 113 are detachably connected together by a screw threaded bolt 115 which may be composed of any suitable material, for example, nylon or stainless steel. That bolt also attaches parts 112 and 113 to a hanger 120 which extends upwardly and is provided with a hooked upper end 121 in which a grommet may be secured to surround a messenger. By employing the hanger, the top cable may be kept the desired distance away from the messenger when high currents, such as 35 kv. or more, are carried by the cables while using parts 112 and 113 which are used with currents of 15 kv.

FIGURE 12 shows a modified form of the device of FIGURE 11. The hanger 120 has been replaced by two hangers 125 having hooks 126 at their upper ends to rest on a messenger and the hooks may be provided with grommets. At their lower ends the hangers 125 are pivotally connected to the upper ends of parts 112 and 113 as by a bolt 127.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A device for use in supporting and spacing aerial cables, said device consisting essentially of alumina, having hardness, rigidity and strength characteristic of fused alumina and being substantially free from warpage, distortion and surface cracks, said device comprising a body including elongated, parallel, integral, thick parts and parts relatively thin as compared with the thick parts and at least two, spaced apart, boss parts projecting from the body and being relatively short as compared with said elongated parts, said boss parts having surfaces adapted to engage aerial cables substantially without deforming them and to space them at least about 3″ apart, at least one of said boss parts being near one end of the body, the thick parts of the body being partly defined on one side thereof by narrow surface portions lying in one plane, the thin parts of the body having surface portions adjacent to and wider than said narrow surfaces and inclined at an angle to said plane, the boss parts having end surface portions lying in said plane, the said surface portions of the body and end surfaces of the boss parts being sufficient in width and length to support the device on a plane surface, during manufacture, against warpage and distortion and to permit it to shrink without cracking.

2. The device set forth in claim 1 in which there are boss parts near the ends of the body.

3. The device set forth in claim 1 in which there is one boss part near the middle of the body.

4. The device set forth in claim 1 in which there is one boss part near one end of the body to engage a messenger and another boss part intermediate the ends of the body.

5. The device set forth in claim 1 in which the said narrow surface portions of the thick part of the body extend for substantially the entire length thereof.

6. The device set forth in claim 1 in which alumina constitutes between about 75% and about 90% of the material of the device.

References Cited in the file of this patent

UNITED STATES PATENTS

| | | |
|---|---|---|
| D. 189,090 | Kelm | Oct. 25, 1960 |
| 511,611 | Hammond | Dec. 26, 1893 |
| 815,506 | Blynt | Mar. 20, 1906 |
| 1,652,938 | Hewlett | Dec. 13, 1927 |
| 2,004,527 | Harvey | June 11, 1935 |
| 2,301,939 | Fischer | Nov. 17, 1942 |
| 2,395,295 | Rowland | Feb. 19, 1946 |
| 2,839,597 | Hendrix | June 17, 1958 |
| 2,912,482 | Horrocks et al. | Nov. 10, 1959 |
| 2,976,344 | Bethel | Mar. 21, 1961 |

FOREIGN PATENTS

| | | |
|---|---|---|
| 104,197 | Australia | June 23, 1938 |
| 722,084 | Great Britain | Jan. 19, 1955 |
| 768,339 | Great Britain | Feb. 13, 1957 |

OTHER REFERENCES

Publication: "Vulkene Aerial Spacer Cable System," published by General Electric Co., Bridgeport 2, Connecticut. (Received in Patent Office Div. 65 on May 21, 1959, 6 pages.)